3,335,067
PROCESS FOR PRODUCING CITRIC ACID
Mario Alexander Batti, Elkhart, Ind., assignor to Miles Laboratories, Inc., Elkhart, Ind., a corporation of Indiana
No Drawing. Filed May 25, 1965, Ser. No. 458,748
6 Claims. (Cl. 195—36)

This invention relates to a process for producing citric acid. More particularly, it relates to a process for producing citric acid wherein oxalic acid contamination is minimized.

It is known in the art that citric acid can be produced in commercial quantities by the fermentation of carbohydrate materials using various strains of citric acid producing fungi. Certain strains of *Aspergillus niger* have proved to be particularly useful for this purpose. In addition, various strains of other species of fungi, such as *Aspergillus clavatus, Aspergillus wentii, Aspergillus luchuensis, Penicillium citrinum, Penicillium luteum* and the like, have been used with varying degrees of success.

The above-described fermentation process produces a fungal mycelium and a fermentation beer containing citric acid. The mycelium is removed from the fermentation beer by filtration. The so-purified fermentation beer is then treated with calcium hydroxide to form a precipitate of calcium citrate which is then removed from the fermentation beer by filtration. The filtrate from this recovery step is called the "spent liquor." Citric acid is then recovered by acidifying the collected calcium citrate.

It is also known in the art that the citric acid fermentation residues obtained from the above-described citric acid fermentation process are useful in animal feed supplements. Such residues are especially useful in poultry feeds to maintain and improve eggshell thickness, particularly during periods of heat stress and under other stress conditions. The expression "citric acid fermentation residue" as used herein is intended to include the filtered mycelium, the spent liquor, and mixtures containing filtered mycelium and spent liquor.

In prior art processes for obtaining citric acid fermentation residues for use in animal feed supplements oxalic acid contamination presented a serious problem. This oxalic acid, which was produced as an undesirable by-product during the fermentation, must be removed from the citric acid fermentation residue before such residue can be employed in an animal feed. One prior art technique for removal of the oxalic acid was to treat the fermentation beer-mycelium mixture with calcium hydroxide to precipitate the oxalic acid as calcium oxalate. The time and temperature conditions employed were such as to prevent formation and precipitation of calcium citrate. The calcium oxalate was then removed along with the mycelium during filtration. This technique removed oxalic acid from the subsequent "spent liquor" but it caused the mycelium to be undesirably contaminated with calcium oxalate. Another prior art technique involved filtration of the mycelium followed by liming to precipitate calcium oxalate which was then removed by filtration. The time and temperature conditions employed were such as to prevent formation of calcium citrate. Subsequent recovery of citric acid produced a spent liquor free of oxalic acid, but the filtered mycelium still contained some oxalic acid. This technique also required a separate filtration step to remove the calcium oxalate. These prior art techniques were unsatisfactory since they required additional processing steps and also did not remove oxalic contamination from all the citric acid fermentation residues.

It is an object of the present invention to provide a fermentation process to produce citric acid and which minimizes the formation of oxalic acid contamination.

It is another object of the present invention to provide a citric acid fermentation process to produce citric acid fermentation residues which are substantially free from oxalic acid.

It is still a further object of the present invention to provide a citric acid fermentation process which requires no additional process steps to produce citric acid fermentation residues which are substantially free of oxalic acid.

In accordance with the present invention a process is provided for the production of substantially oxalic acid-free citric acid fermentation residues which comprises carrying out a citric acid fermentation under controlled conditions of alkali metal/phosphate weight ratio and pH in the fermentation medium and then separating the citric acid fermentation residues. More particularly, the invention relates to a process for the production of substantially oxalic acid-free citric acid fermentation residues useful in animal feed supplements which comprises subjecting a citric acid fermentation medium containing an alkali metal/phosphate weight ratio of less than about 0.83 to the action of a citric acid producing strain of fungus until a desired amount of citric acid is produced, wherein the pH of the fermentation medium is maintained below about 2.0 for substantially the entire fermentation run, and then separating the citric acid fermentation residues.

The general process conditions for carrying out the citric acid fermentation are described, for example, in U.S. Patents Nos. 2,476,159, of L. B. Schweiger et al.; 2,492,667, of R. L. Snell et al.; 2,492,673, of J. C. Woodward et al.; 2,916,420, of L. B. Schweiger; 2,970,084, of L. B. Schweiger, and 3,083,144, of M. W. Shepard. Such general process conditions are followed in carrying out the present invention which relates principally to a specific alkali metal/phosphate weight ratio in the fermentation medium and maintenance of specific pH values in such medium in order to suppress the formation of oxalic acid during the citric acid fermentation. Such improvement enables citric acid fermentation residues to be obtained which are substantially free of oxalic acid and are thus more useful in animal feed supplements. This improved process also tends to improve the overall conversion of carbohydrates to citric acid since the undesirable conversion of carbohydrates to oxalic acid is minimized or prevented entirely.

The fermentation medium employed in the citric acid fermentation process of the present invention contains the carbohydrate raw material and additional nutrients required by the fungus to convert the carbohydrate to citric acid. The carbohydrate materials useful in the present invention can be any of the sugar-containing materials known to the art. Such materials are exemplified by sugar syrups obtained from natural sources such as cane syrup, and sugar-containing materials obtained by hydrolysis of starch, such as corn starch. The hydrolysis of starch to form sugar can be catalyzed by the well known use of hydrochloric acid or enzymes, such as amyloglucosidase.

Among the nutrients found to be necessary to the fungus to produce citric acid are alkali metals, such as potassium or sodium, and phosphates. Such alkali metals and phosphates are supplied in the form of water-soluble compounds. Frequently the same compound, such as $KH_2PO_4$, can be used to supply both the alkali metal constituent and the phosphate constituent.

Citric acid begins to form, in a properly functioning fermentation, within about 16 hours after inoculation of the fermentation medium with the appropriate fungal strain. Once citric acid begins to form, the pH of the fermentation medium drops to a value below about 2.0. In the preferred prior art citric acid process, supplemental nitrogen nutrients were periodically added during the fermentation. When such nitrogen nutrients were added, preferably in the form of $NH_4OH$, the pH of the fermentation medium frequently rose to a value above about 2.0 and often remained at such level for a considerable period of time.

It has been found that whenever the pH of the fermentation medium is maintained at a level over about 2.0 for any appreciable period of time the formation of oxalic acid is promoted. It has also been found that even though the pH of the fermentation medium never exceeds 2.0 during the run, oxalic acid production is promoted by an alkali metal/phosphate weight ratio in the fermentation medium of over about 0.83. Under these conditions the oxalic acid formed presents recovery problems when the citric acid fermentation residues are to be used in animal feeds. Oxalic acid formation can be suppressed and improved citric acid fermentation residues can be obtained by employing an alkali metal/phosphate weight ratio in the fermentation medium below about 0.83 and also maintaining the pH of the fermentation medium below 2.0 during substantially the entire citric acid fermentation run. Preferably the alkali metal/phosphate weight ratio is less than about 0.6.

The invention will be described in further detail in the following examples.

*Example 1*

A 46 lb. quantity of refined cane sugar was mixed with distilled water to a total volume of 110 liters. This solution was acidulated to pH 1.75 by the addition of 66 ml. sulfuric acid. The acidified solution was then heated to 49° C. and passed at a rate of 240 ml./min. through a 0.1 cu. ft. bed of Nalcite HCR cationic ion-exchange material. This is a strongly acid cation exchange resin marketed by the National Aluminate Co. The 100 liters of decationized effluent had a pH of 1.49. Nutrients were added to this effluent in an amount of 0.0038 weight percent KCl, 0.1 weight percent $MgSO_4 \cdot 7H_2O$, 50 p.p.m. (parts per million by weight) $Ca^{++}$ ions as $CaCl_2 \cdot 2H_2O$ and sufficient $NH_4OH$ to adjust the pH to 3.3. This mixture was then autoclaved for 10 min. at 250° F. (121° C.) and 16–18 p.s.i.g. to sterilize it. This sterilized fermentation substrate and nutrient mixture was then cooled to room temperature. A 4 liter quantity was charged to a vertical aerated fermentor. This fermentor consisted of a vertical glass pipe 4-in. O.D. and 48-in. long. The ends of the pipe were sealed with stainless steel end plates provided with air inlet and outlet passages. A glass sparger was attached to the air inlet line near the bottom of the glass pipe to provide desired air distribution throughout the fermentor contents. To the 4 liter fermentor contents were added 0.007 weight percent $KH_2PO_4$, 0.10 p.p.m. $Cu^{++}$ ions as $CuSO_4 \cdot 5H_2O$, 0.10 p.p.m. $Zn^{++}$ ions as $ZnSO_4 \cdot 7H_2O$ and 0.10 p.p.m. $Fe^{+++}$ ions as ferric ammonium citrate. These additives were previously sterilized. This resulting fermentation medium contained 40 p.p.m. potassium and 49 p.p.m. phosphate for an alkali metal/phosphate weight ratio of 0.816. Aeration was started at 6 liters of air per minute. The fermentor contents were then inoculated with an aqueous suspension of *Aspergillus niger* spores. The fermentor was then heated to 30–33° C. and the aeration continued at the above rate for 24 hours. The aeration was then increased to 7 liters per minute. At 41 hours after inoculation the fermentation medium pH was 1.81. At 66 hours after inoculation 5 ml. of conc. $NH_4OH$ were added resulting in a pH of 1.77. At 91 hours after inoculation 5 ml. of conc. $NH_4OH$ were added. At 137 hours after inoculation 5 ml. of conc. $NH_4OH$ were added. At 210 hours after inoculation 3.3 ml. of conc. $NH_4OH$ were added resulting in a pH of 1.58. The $NH_4OH$ was periodically added to supplement the nitrogen nutrient content of the fermentation medium. The fermentation was continued for a total of 260 hours and then terminated. At no time was the pH allowed to go over about 2.0 during the run. There were 691 grams of citric acid and negligible oxalic acid produced during this run. The mycelium produced during this run was then filtered off and utilized as an animal feed supplement of superior quality since it contained negligible amounts of undesirable oxalic acid. The citric acid can be recovered from the mycelium filtrate by adding calcium hydroxide to precipitate calcium citrate, filtering the calcium citrate from the spent liquor and then acidifying the calcium citrate. The spent liquor was also free of oxalic acid and was useful in animal feed supplements.

*Example 2*

A 4 liter quantity of sterilized fermentation substrate and nutrient mixture prepared as in Example 1 above was placed in a vertical aerated fermentor. To the fermentor contents were added 0.014 weight percent $KH_2PO_4$, 0.1 p.p.m. $Cu^{++}$ ions, 0.1 p.p.m. $Zn^{++}$ ions and 0.1 p.p.m. $Fe^{+++}$ ions. These additives were previously sterilized. This resulting fermentation medium contained 60 p.p.m. potassium and 98 p.p.m. phosphate for an alkali metal/phosphate weight ratio of 0.612. The fermentor was inoculated and fermentation was carried out in a manner described in Example 1. Conc. $NH_4OH$ was added in amounts of 4 ml. after 41 hours of fermentation and 5 ml. after 66, 91 and 137 hours of fermentation. The fermentation was continued for a total of 260 hours and then terminated. The pH was maintained below 2 during substantially the entire run and was allowed over 2 for a short time after 41 hours of fermentation. There were 640 grams of citric acid and no detectable oxalic acid produced during this run. The mycelium produced during this run was then filtered off and utilized as an animal feed supplement of superior quality since it contained no oxalic acid. The spent liquor from the citric acid recovery could also be used.

*Example 3*

A 4 liter fermentation medium was prepared in the manner described in Example 1 above and the fermentation was carried out in the general manner of Example 1. Additions of $NH_4OH$ produced a pH of 2.2 after 41 hours of fermentation and pH 2.0 after 66 hours of fermentation. During the remainder of the run the pH remained below 2. The fermentation was continued for a total of 258 hours and then terminated. There were 742 grams of citric acid produced during this run along with gross amounts of oxalic acid (greater than 1 gram per liter of fermentation beer). Mycelium and spent liquor obtained from this run were unsuitable for animal feed supplements since they contained gross amounts of oxalic acid. This oxalic acid was produced during the relatively long periods at pH levels above 2.

*Example 4*

A 100 liter refined cane sugar solution containing 20 weight percent sugar solids was acidulated with 100 ml. sulfuric acid to pH 1.53. The acidified solution was then heated to 49° C. and passed at a rate of 160 ml./min. through a 0.05 cu. ft. bed of Nalcite HGR cationic ion-exchange material. This is a strongly acid cation exchange resin marketed by the National Aluminate Co. The 97 liters of decationized effluent had a pH of 1.43–1.49. Nutrients were added to this effluent in an amount of 0.1 weight percent $MgSO_4 \cdot 7H_2O$, 50 p.p.m. $Ca^{++}$ ions as $CaCl_2 \cdot 2H_2O$ and 280 ml. of $NH_4OH$ to adjust the pH to 3.15. This mixture was then autoclaved for 10 min. at 121° C. and 16–18 p.s.i.g. to sterilize it. This sterilized liquid was then cooled to room temperature. A 4 liter portion of the above-prepared fermentation medium was placed in a vertical aerated fermentor. To the fermentor contents were added 41 p.p.m. potassium as KCl, 49 p.p.m. phosphate as $H_3PO_4$, 0.1 p.p.m. $Cu^{++}$ ions as $CuSO_4 \cdot 5H_2O$, 0.1 p.p.m. $Zn^{++}$ ions as $$ZnSO_4 \cdot 7H_2O$$

and 0.1 p.p.m. $Fe^{+++}$ ions as ferric ammonium citrate.

These additives were previously sterilized. The potassium/phosphate weight ratio was 0.84. Aeration was started at 6 liters of air per minute. The fermentor contents were then inoculated with an aqueous suspension of *Aspergillus niger* spores. The fermentor was heated to 30–33° C. and the aeration continued at the above rate for 24 hours. The aeration was then increased to 7 liters per minute. At 40 hours after inoculation the fermentation medium pH was 1.9. The pH was increased at 42 hours after inoculation to 2.7 by addition of 10 ml. of conc. $NH_4OH$. The pH quickly was reduced to a value below 2.0. Additional quantities of $NH_4OH$ as supplemental nitrogen nutrient were added after 88 and 160 hours. The fermentation was continued for a total of 281 hours and then terminated. The pH was maintained below 2 during substantially the entire run. There were 468 grams of citric acid produced during the run along with gross amounts of oxalic acid. Mycelium and spent liquor obtained from this run were unsuitable for animal feed supplements because of the high oxalic acid content. The oxalic acid was produced because the alkali metal/phosphate weight ratio was over about 0.83 during this run.

*Example 5*

A 4 liter portion of the fermentation medium described in Example 4 above was placed in a vertical aerated fermentor. To the fermentor contents were added 41 p.p.m. potassium as KCl, 147 p.p.m. phosphate as $H_3PO_4$, 40 p.p.m. sodium as NaCl, 0.2 p.p.m. $Cu^{++}$ ions as $CuSO_4 \cdot 5H_2O$, 0.2 p.p.m. $Zn^{++}$ ions as $ZnSO_4 \cdot 7H_2O$ and 0.1 p.p.m. $Fe^{+++}$ ions as ferric ammonium citrate. These additives were previously sterilized. The alkali metal (potassium+sodium)/phosphate weight ratio was 0.55. Aeration was started at 6 liters of air per minute. The fermentor contents were then inoculated with an aqueous suspension of *Aspergillus niger* spores. The fermentor was heated to 30–33° C. and the aeration continued at the above rate for 24 hours. The aeration was then increased to 7 liters per minute. At 64 hours after inoculation the fermentation medium pH was increased to 1.95 by addition of 7 ml. of conc. $NH_4OH$. Supplemental nitrogen nutrient in the form of $NH_4OH$ was also added at 136 and 232 hours. The pH was maintained below 2 throughout the entire run. The fermentation was continued for a total of 281 hours and then terminated. There were 672 grams of citric acid produced during the run and no detectable amounts of oxalic acid were produced. The fermentation mycelium was then filtered off and utilized as an animal feed supplement of superior quality since it contained no oxalic acid. The spent liquor from citric acid recovery could also be used.

In summary, this invention relates to a process of producing citric acid wherein oxalic acid contamination formation is minimized. This allows the production of fermentation residues substantially free of oxalic acid and thus suitable in animal feed supplements. Such improved process contains the novel features of carrying out the citric acid-producing fermentation in a fermentation medium having an alkali metal/phosphate weight ratio less than about 0.83 and wherein the pH of the fermentation medium is maintained at less than about 2.0 for substantially the entire citric acid-producing portion of the fermentation.

What is claimed is:

1. In a process for producing citric acid by the action of a citric acid-producing strain of fungus on a carbohydrate fermentation medium containing alkali metal and phosphate nutrients, the improvement which comprises utilizing in said medium alkali metal and phosphate nutrients in a weight ratio of less than about 0.83, and maintaining the pH of the fermentation medium below about 2.0 for substantially the entire fermentation run.

2. A process according to claim 1 wherein the alkali metal/phosphate weight ratio is less than about 0.6.

3. A process according to claim 1 wherein the alkali metal is potassium.

4. A process according to claim 1 wherein the alkali metal is a mixture of potassium and sodium.

5. A process for the production of substantially oxalic acid-free citric acid fermentation residues useful in animal feed supplements which comprises subjecting a citric acid fermentation medium containing an alkali metal/phosphate weight ratio of less than about 0.83 to the action of a citric acid producing strain of fungus until a desired amount of citric acid is produced, wherein the pH of the fermentation medium is maintained below about 2.0 for substantially the entire fermentation run, and then separating the citric acid fermentation residues.

6. A process according to claim 5 wherein the citric acid fermentation residues are selected from the class consisting of fermentation mycelium, spent liquor from citric acid recovery and mixtures of said fermentation mycelium and spent liquor.

References Cited

UNITED STATES PATENTS 2,883,329  4/1959  Vergnaud et al. _____ 195—36
3,105,015  9/1963  Tveit _____ 195—36

A. LOUIS MONACELL, *Primary Examiner.*

L. M. SHAPIRO, *Assistant Examiner.*